United States Patent
Pezeshki et al.

(10) Patent No.: US 12,532,340 B2
(45) Date of Patent: Jan. 20, 2026

(54) INTERFERENCE MEASUREMENT PER SUBBAND PER TX BEAM FOR COMBINATION OF FDM AND MU-MIMO

(71) Applicant: QUALCOMM Incorporated, San Diego, CA (US)

(72) Inventors: Hamed Pezeshki, San Diego, CA (US); Tao Luo, San Diego, CA (US); Arumugam Chendamarai Kannan, San Diego, CA (US); Yan Zhou, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/993,108

(22) Filed: Aug. 13, 2020

(65) Prior Publication Data

US 2021/0051676 A1 Feb. 18, 2021

Related U.S. Application Data

(60) Provisional application No. 62/886,897, filed on Aug. 14, 2019.

(51) Int. Cl.
*H04W 72/541* (2023.01)
*H04L 5/00* (2006.01)
*H04W 72/542* (2023.01)

(52) U.S. Cl.
CPC ......... *H04W 72/541* (2023.01); *H04L 5/0037* (2013.01); *H04L 5/0051* (2013.01); *H04W 72/542* (2023.01)

(58) Field of Classification Search
CPC ........... H04W 72/082; H04W 72/1231; H04W 16/14; H04W 72/04; H04W 72/12;
(Continued)

(56) References Cited

U.S. PATENT DOCUMENTS

2014/0086082 A1* 3/2014 Kim ............... H04W 24/10
370/252
2014/0254516 A1* 9/2014 Lee ............... H04W 74/002
370/329
(Continued)

FOREIGN PATENT DOCUMENTS

| CN | 101317412 A | 12/2008 |
| CN | 106105052 A | 11/2016 |
| CN | 108347286 A | 7/2018 |

OTHER PUBLICATIONS

International Search Report and Written Opinion—PCT/US2020/046557—ISA/EPO—Oct. 16, 2020.
(Continued)

*Primary Examiner* — Ian N Moore
*Assistant Examiner* — Latresa A McCallum
(74) *Attorney, Agent, or Firm* — ArentFox Schiff, LLP

(57) ABSTRACT

Aspects presented herein provide for improved measurement and management of interference for different subbands and different Tx beams for communication with the UEs. A UE may be configured to receive scheduling for communication with a base station in a first beam direction using a first subband. The UE may be configured to measure interference of a second subband for a second beam direction. The UE may be further configured to report the measured interference to the base station. A base station may be configured to schedule communication with the UE in the first beam direction using the first subband. The base station may be further configured to receive the report of interference measured by the UE on the second subband in the second beam direction.

22 Claims, 13 Drawing Sheets

(58) Field of Classification Search
CPC . H04L 5/0037; H04L 5/0051; H04L 27/0006; G01S 7/021
See application file for complete search history.

(56) References Cited

U.S. PATENT DOCUMENTS

| | | | |
|---|---|---|---|
| 2015/0263796 A1 | 9/2015 | Nam et al. | |
| 2015/0319636 A1 | 11/2015 | Lee et al. | |
| 2016/0135143 A1* | 5/2016 | Won | H04W 12/08 370/312 |
| 2017/0264466 A1* | 9/2017 | Hosseini | H04L 25/021 |
| 2017/0367046 A1* | 12/2017 | Papasakellariou | H04W 72/23 |
| 2017/0367095 A1* | 12/2017 | Chen | H04W 72/0453 |
| 2018/0115438 A1* | 4/2018 | Park | H04W 84/12 |
| 2018/0184409 A1* | 6/2018 | Min | H04W 72/12 |
| 2018/0262313 A1* | 9/2018 | Nam | H04L 5/0044 |
| 2019/0045460 A1* | 2/2019 | Muruganathan | H04W 52/367 |
| 2019/0110310 A1* | 4/2019 | Obregon | H04W 72/1284 |
| 2019/0149216 A1* | 5/2019 | Tsai | H04L 5/0057 370/329 |
| 2019/0190668 A1 | 6/2019 | Lei et al. | |
| 2020/0028640 A1* | 1/2020 | Yeo | H04L 5/005 |
| 2020/0067612 A1* | 2/2020 | Wu | H04L 1/0026 |
| 2020/0274668 A1* | 8/2020 | Yamada | H04L 41/0806 |
| 2021/0289531 A1* | 9/2021 | Su | H04B 7/0452 |
| 2024/0388347 A1* | 11/2024 | Kim | H04L 5/005 |

OTHER PUBLICATIONS

Qualcomm Incorporated: "Discussion on Bursty Interference Measurement Resources", 3GPP Draft, 3GPP TSG RAN WG1 Meeting #90, R1-1713415, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017 Aug. 20, 2017 (Aug. 20, 2017), XP051316217, pp. 1-6, Retrieved from the Internet: URL:http://www.3gpp.org/ftp/Meetings_3GPP_SYNC/RAN1/Docs/ [retrieved on Aug. 20, 2017] Section 2.1.

* cited by examiner

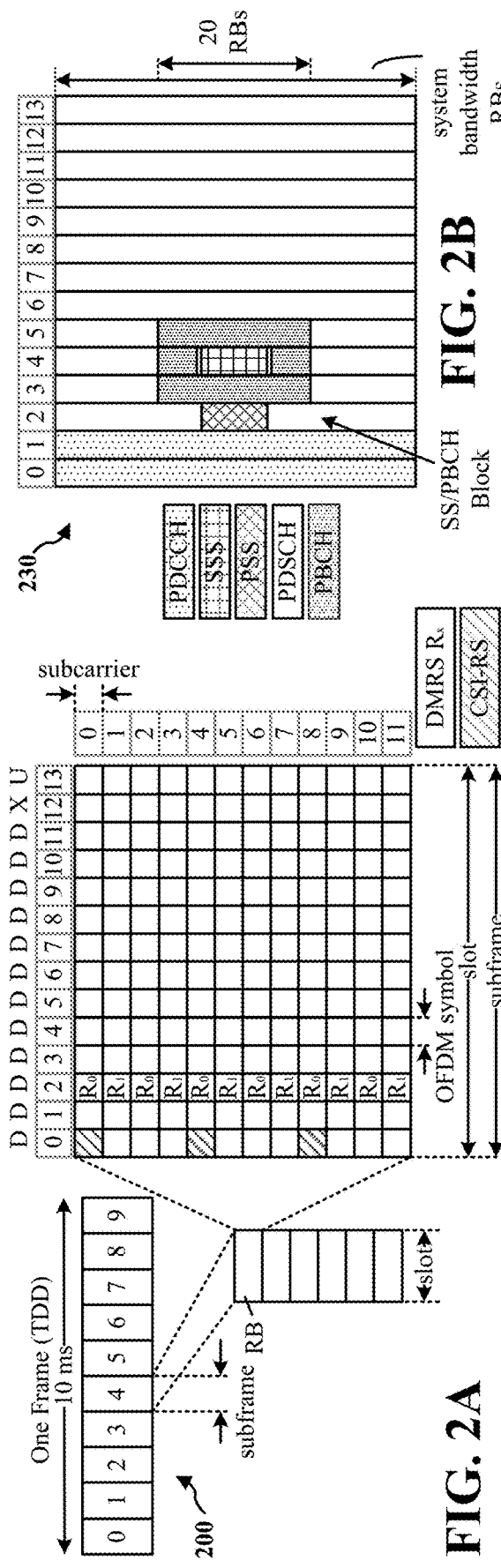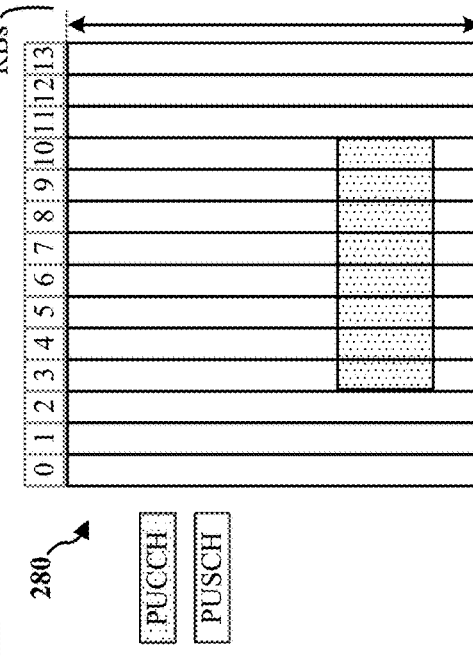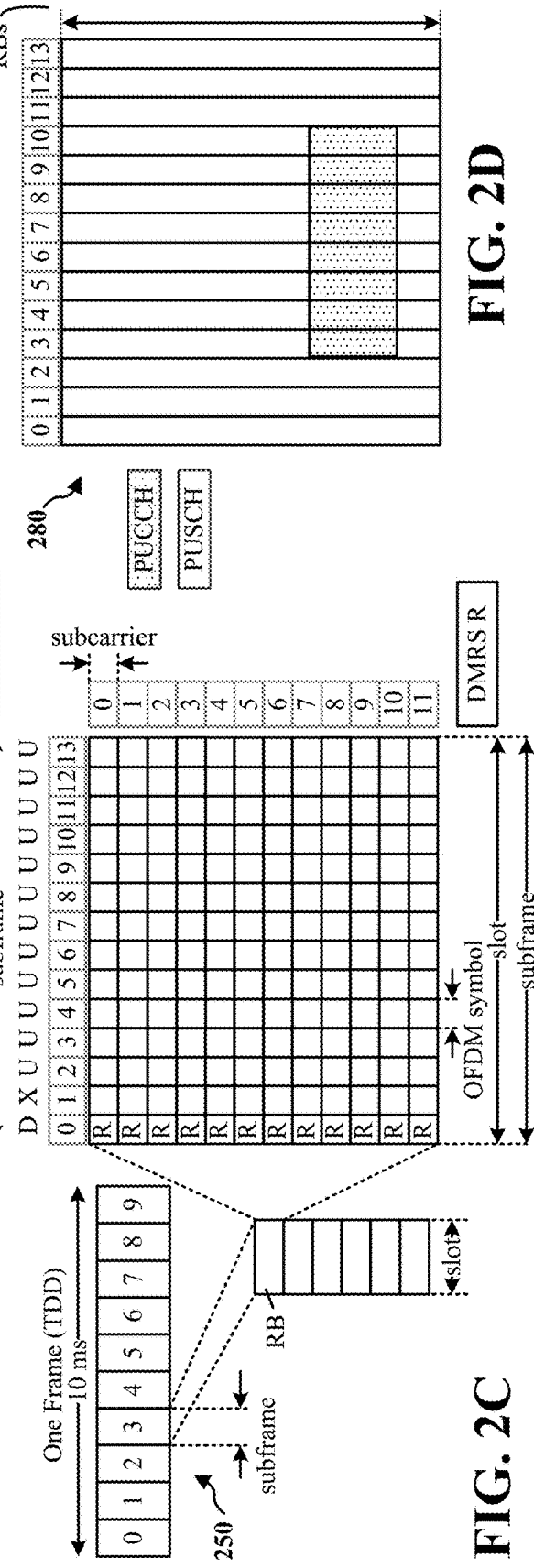
FIG. 2A  FIG. 2B  FIG. 2C  FIG. 2D

INTERFERENCE MEASUREMENT PER SUBBAND PER TX BEAM FOR COMBINATION OF FDM AND MU-MIMO

CROSS REFERENCE TO RELATED APPLICATION(S)

This application claims the benefit of U.S. Provisional Application Ser. No. 62/886,897, entitled "INTERFERENCE MEASUREMENT PER SUBBAND PER TX BEAM FOR COMBINATION OF FDM AND MU-MIMO" and filed on Aug. 14, 2019, which is expressly incorporated by reference herein in its entirety.

BACKGROUND

Technical Field

The present disclosure relates generally to communication systems, and more particularly, to interference measurement in wireless communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

When a base station transmits communication to user equipment (UEs) using a combination of multi-panel Frequency-Division Multiplexing (FDM) and analog beamforming (BF)-based multi-user-multiple input multiple output (MU-MIMO), it may be challenging for the base station to determine interference for different subbands and different transmission (Tx) beams within each subband for the purpose of scheduling the UEs. In some applications, specific numbers of UEs may be supported with a particular delay budget. Aspects presented herein provide for improved measurement and management of interference for different subbands and different Tx beams for communication with the UEs. Aspects may provide an efficient way to determine interference in a particular subband for a specific Tx beam and to find a better beam and subband for transmitting communication to a UE.

In an aspect of the disclosure, a method, a computer-readable medium, and an apparatus are provided. The apparatus may be a UE configured to receive scheduling for communication with a base station in a first beam direction using a first subband. The apparatus may be configured to measure interference of a second subband for a second beam direction. The apparatus may be further configured to report the measured interference to the base station.

In another aspect of the disclosure, a method, a computer-readable medium, and an apparatus are provided. The apparatus may be a base station configured to schedule communication with a UE in a first beam direction using a first subband. The apparatus may be further configured to receive a report of interference measured by the UE on a second subband in a second beam direction.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
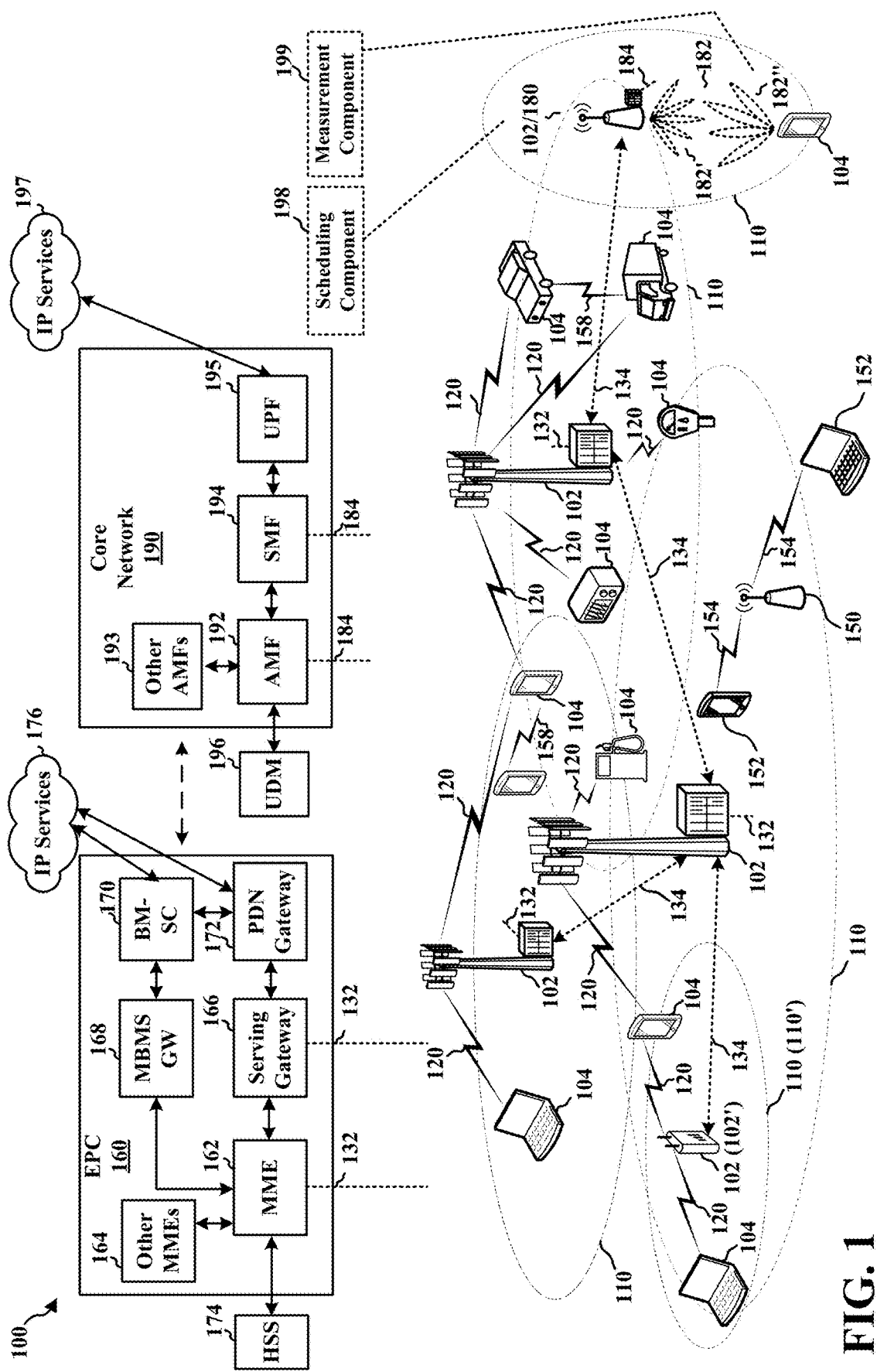
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may comprise a scheduling component 198 configured to schedule communication with the UE 104 in a first beam direction using a first subband. The base station 180 may also be configured to receive a report of interference measured by the UE 104 on a second subband in a second beam direction. The scheduling component 198 may use the report about the interference measured by the UE 104 on the second subband in the second beam direction to select a new beam/subband for communication with the UE. The base station 180 may then schedule communication with the base station for the UE 104 using the second beam direction and the second subband. The UE 104 may comprise a measurement component 199 configured to measure interference of the second subband for the second beam direction while the UE is scheduled for communication on a different Tx beam and subband and to report the measured interference to the base station 180. The base station 180 may also report downlink modulation reference signal (DMRS) locations for other UEs scheduled in the second subband in the second beam direction to the UE 104, and the UE 104 may remove the DMRS for the other UEs from the interference measured in the second subband in the second beam direction, such that the reported measured interference represents the inter-cell interference for the UE 104 in the second subband in the second beam direction. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu *15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
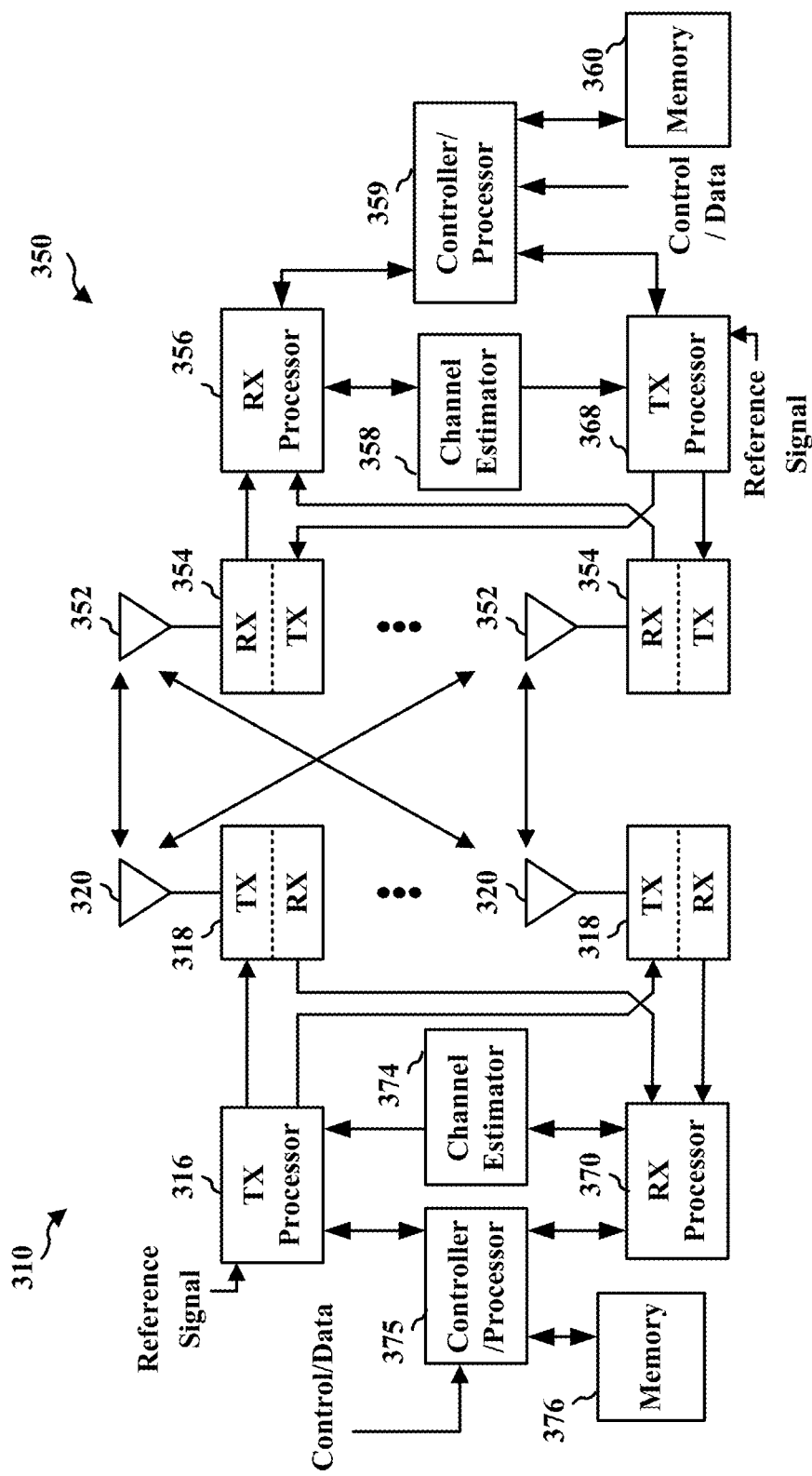
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. At least one of the TX processor 368, the RX processor 356, and the controller/processor 359 may be configured to perform aspects in connection with 199 of FIG. 1. At least one of the TX processor 316, the RX processor 370, and the controller/processor 375 may be configured to perform aspects in connection with 198 of FIG. 1.

When a base station transmits communication to UEs using a combination of multi-panel FDM and analog BF-based MU-MIMO, it may be challenging for a base station to determine interference for different subbands and different Tx beams within each subband, for the purpose of scheduling the UEs. In some applications, specific numbers of UEs may be supported with a particular delay budget. In order to pack as many UEs as possible, multiplexing may be increased. For example, even for each subband, there may be several beams multiplexing to meet the requirements. However, increasing multiplexing may result in interference for different subbands and different Tx beams within each subband. Thus, the measurement and management of interference for different subbands and different Tx beams within each subband becomes desirable. There may be a need to introduce methods for measuring interference in a specific subband for a specific Tx beam and find a better beam and subband to transmit. Aspects presented herein provide for improved measurement and management of interference for different subbands and different Tx beams for communication with the UEs. Aspects may provide an efficient way to determine interference in a particular subband for a specific Tx beam and to find a better beam and subband for transmitting communication to a UE.

Figure 4:
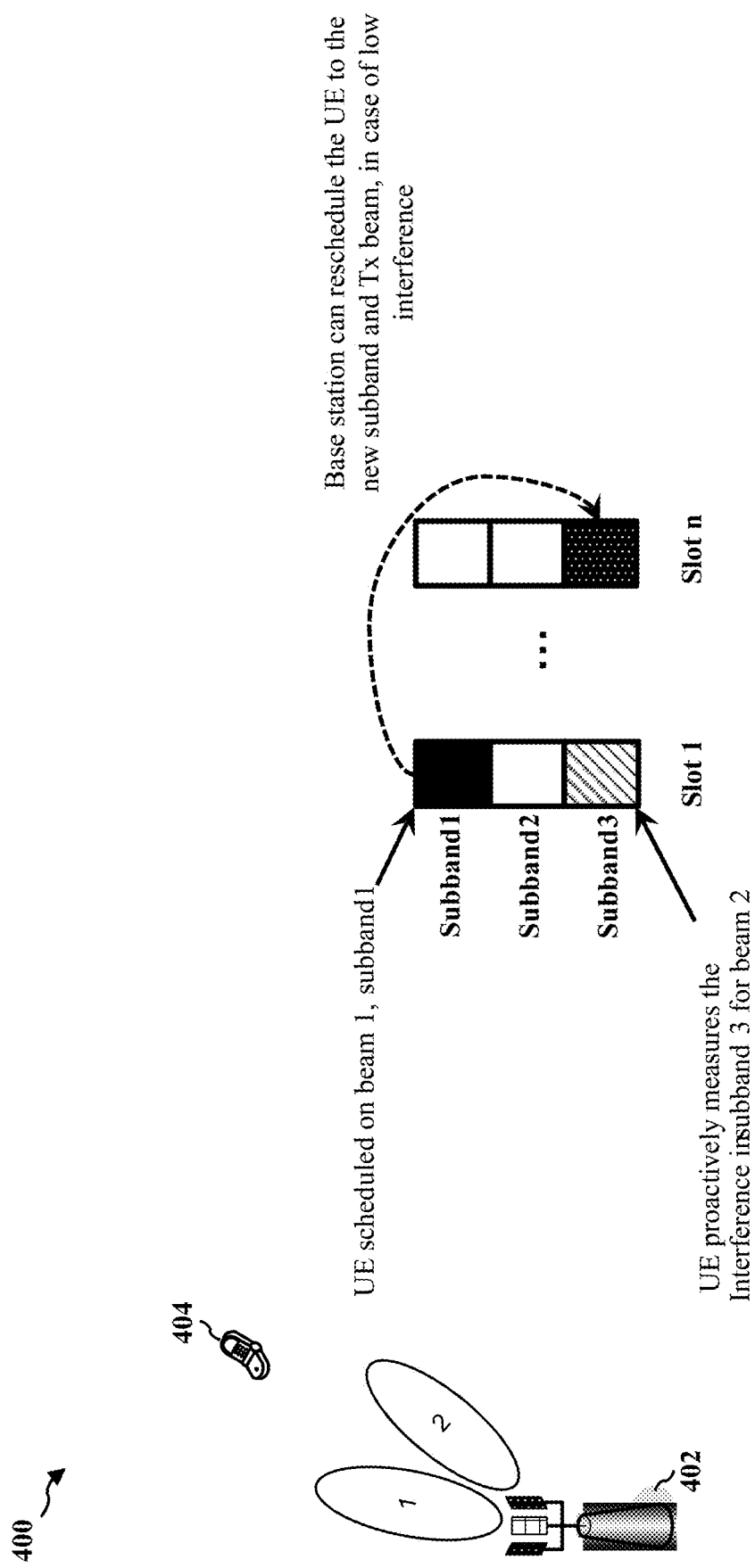
FIG. 4 illustrates an example of interference measurement per subband per Tx beam.

FIG. 4 illustrates an example 400 of interference measurement per subband per Tx beam. This approach involves non-intrusive measurement of a subband and a Tx beam direction but intrusive scheduling. In this approach, a UE 404 may measure interference on a beam and subband combination that the UE 404 is not currently using to communicate (e.g., receive downlink transmissions) with a base station. The interference measurement may be based on a measured Signal to Interference plus Noise Ratio (SINR), Reference Signal Received Power (RSRP), etc., for the Tx beam and subband(s). Thus, the UE 404 measures interference on a subband and Tx beam direction without active traffic for the UE 404. The UE 404 may provide a report of the measured interference to the base station 402. The UE may report interference for one or more Tx beam direction and subband combination. The UE may proactively measure and report the measured interference, e.g., without receiving instructions from the base station to perform the measurement. In other examples, the UE may receive an indication from the base station to perform the measurement. In the example in FIG. 4, the UE may measure the interference on the Tx beam/subband without a reference signal from the base station. In the example without a reference signal, if the UE 404 is later scheduled for the measured subband and Tx beam direction combination, other UEs that are scheduled for the subband or Tx beam direction may be impacted.

In FIG. 4, the base station 402 schedules the UE 404 on beam 1 in subband 1 in slot 1. The UE 404 may measure the interference using beam 2 in subband 3 in time slot 1. In some aspects, the UE 404 may measure the interference using beam 2 in sibband 3 in another slot (e.g., in the slot following Slot 1). The UE 404 may also measure the interference using other beam-subband combinations (e.g., beam 2 in subband 2). The UE 404 may measure the interference for beam 2 in subband 3, e.g., based on SINR, RSRP, etc., without active traffic for the UE 404 on beam 2 in subband 3.

The base station 402 may send demodulation reference signal (DMRS) locations for the other UEs that have been scheduled in the beam-subband combination to be measured (e.g., other UEs scheduled to use beam 2 in subband 3), to the UE 404, such that the UE 404 may measure the DMRS for the other UEs to estimate an intra-cell interference. By compensating for the intra-cell interference (e.g., subtracting the intra-cell interference from a total measured received power), the UE 404 or the base station 702 may have an estimate of the inter-cell interference on the measured subband and beam. The UE 404 may report the inter-cell interference to the base station 402, and/or may report the overall interference and the intra-cell interference to the base station 402.

The base station 402 may further indicate to the UE 404 which Rx beam to use in each subband, such that the UE 404 may perform standalone interference measurement.

In some aspects, the UE 404 may measure the interference in another subband using the same beam as it is scheduled to use for data reception. For example, the base station 402 may schedule the UE 404 on beam 1 in subband 1 in slot 1. The UE 404 may measure the interference using beam 1 in subband 2 or beam 1 in subband 3. In such aspects, the UE 404 does not need to switch the receive beam being used to perform the measurement of the other subband, which may use fewer resources of the UE 404.

If the interference measurements show low interference (e.g., low interference from active traffic and/or low inter-cell interference) in the measured beam and subband, and/or the quality of the current Tx beam and subband (e.g., beam 1 in subband 1) is poor, the base station 402 may reschedule the UE 404 in the measured subband and beam combination (e.g., beam 2 in subband 3) so that the UE 404 may experience lower interference. In this way, the UE 404 may assist the base station in improving interference management and finding a better beam and subband to transmit communication to the UE 404.

In the example in FIG. 4, there may be no resources configured for the UE 404 to perform the measurements. Thus, the base station 402 might not schedule resources for the measurement or transmit a reference signal for the UE 404 to use in performing the measurement. The base station 402 may configure the UE 404 for an interference report. Therefore, the UE 404 may use resources that are not configured or scheduled for interference measurement, e.g., as selected by the UE 404, and may send the report to the base station 402 based on the report configuration. As a reference signal (RS) for the UE 404 is not transmitted from the base station 402 in this approach, if the UE 404 is scheduled for the measured subband and Tx beam direction (e.g., beam 2 and subband 3 in slot n), other UEs that are scheduled for the same subband and Tx beam direction may suffer from interference caused by transmissions to the UE 404.

Figure 5:
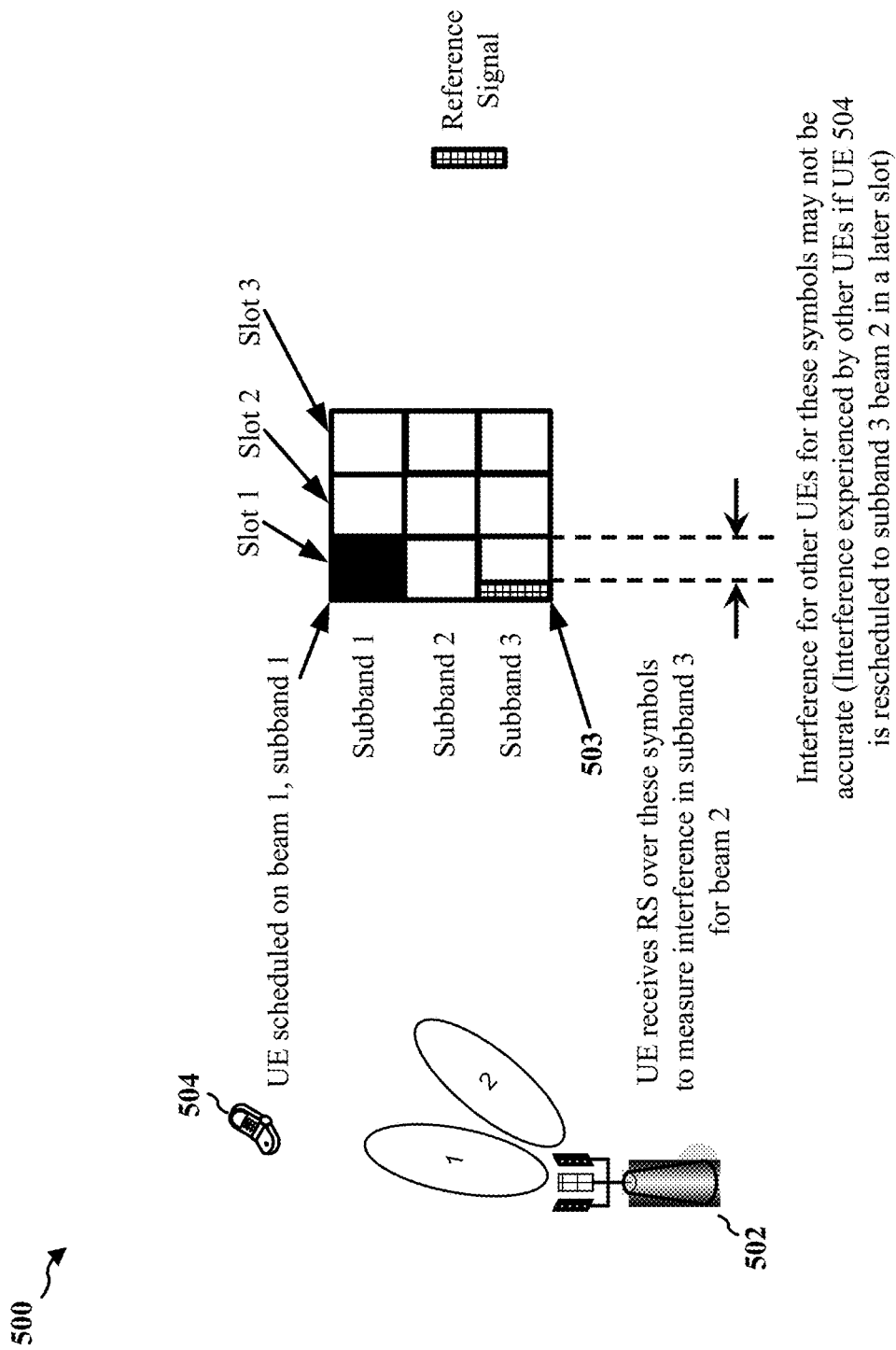
FIG. 5 illustrates another example of interference measurement per subband per Tx beam.

FIG. 5 illustrates another example 500 of interference measurement for a subband and Tx beam combination that is different than the beam direction and subband on which UE 504 is scheduled by the base station 502. The approach in FIG. 5 may involve a partial intrusive measurement in the measured subband and beam direction by the base station 502 transmitting a signal for the UE 504 on the measured subband and beam direction during a portion of the slot in which the UE 504 performs the measurement. As the base station 502 transmits a signal in a portion of the slot, using the measured Tx beam and subband, later scheduling of the UE 504 on the Tx beam and subband may be non-intrusive because other UEs may be aware of the potential interference based on the transmission of the signal from the base station (e.g., the other UEs may determine potential interference that would result from the UE 504 being rescheduled to the measured subband and beam direction based on the signal transmitted to the UE 504 in the measured subband and beam direction). In this approach, the base station 502 may transmit a RS (e.g., CSI-RS) in a subband and a specific Tx beam direction during a subset of symbols (e.g., 503) where other UEs may be co-scheduled. As illustrated in FIG. 5, the UE 504 may be scheduled on beam 1 and subband 1. The UE 504 may receive the RS from the base station 502 in a subset of symbols 503 in subband 3 and Tx beam 2 during a part of slot 1. The UE 504 may measure the interference of active traffic in subband 3 for beam 2 in slot 1 using the RS 503 that it receives from the base station. If the base station changes to scheduling the UE 504 on subband 3 and beam 2, the interference measured by other UEs (e.g., that would result from rescheduling of the UE 504 to subband 3 and beam 2) may be accurate for some of the subset of symbols (e.g., in which the RS was transmitted), but there may be an interference mismatch for the other symbols. The approach in FIG. 5 utilizes more resources for transmissions by the base station 502 for the UE 504 yet may provide non-intrusive scheduling by the base station.

Figure 6:
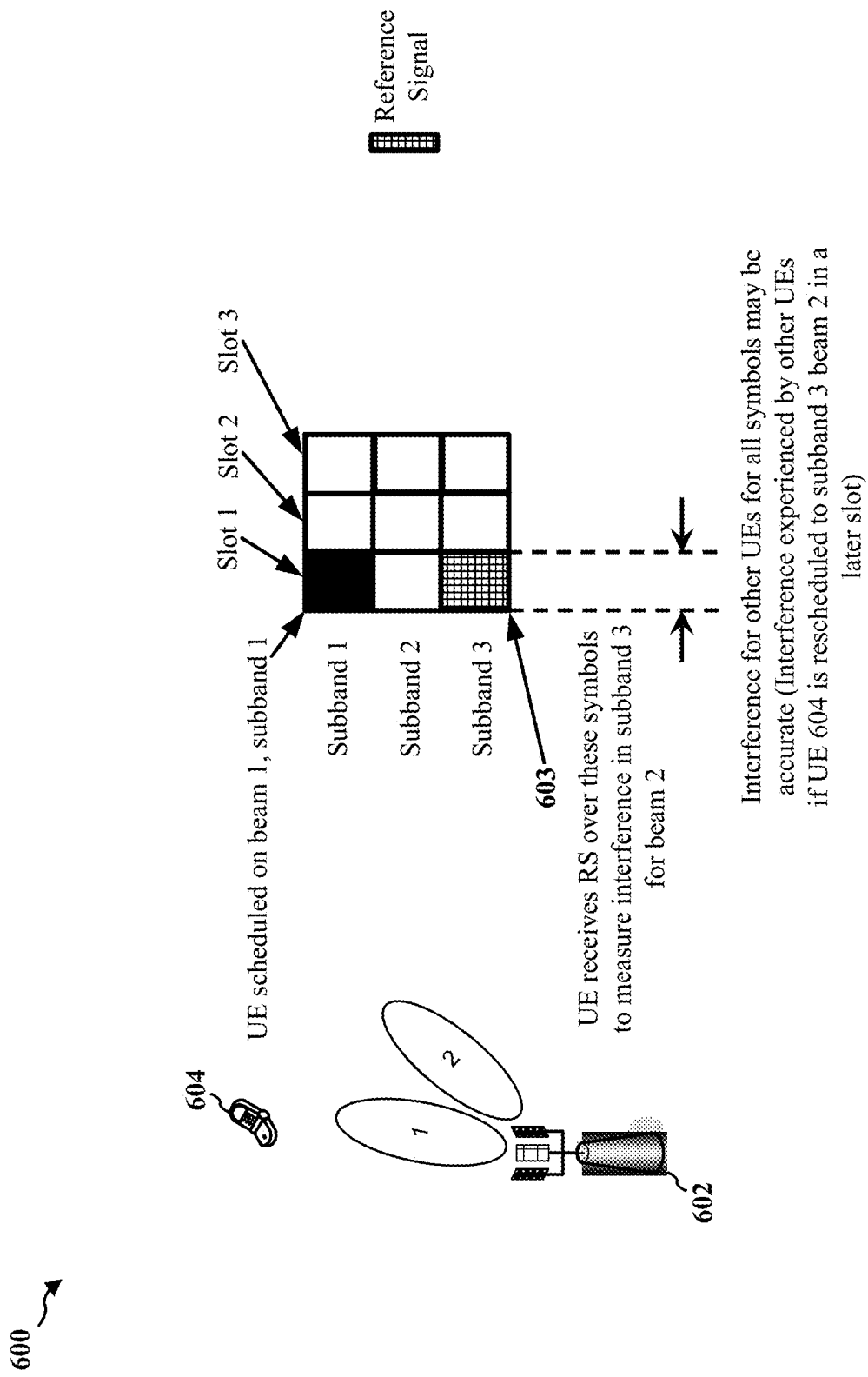
FIG. 6 illustrates yet another example of interference measurement per subband per Tx beam.

FIG. 6 illustrates yet another example 600 of interference measurement per subband per Tx beam. The example in FIG. 6 may include a fully intrusive measurement. Similar to the examples described in connection with FIGS. 4 and 5, the UE 604 may measure interference for a Tx beam and subband combination for which the UE is not scheduled by the base station 602. In the example 600, the base station may transmit the RS over each symbol of the slot for measurement. As illustrated in FIG. 6, for example, the UE 604 may be scheduled on beam 1 and subband 1. The UE 604 may measure interference in subband 3 for beam 2 during slot 1 by receiving RS 603 from the base station 602 in each symbol of slot 1. The UE 604 may measure the interference of active traffic in subband 3 for beam 2 in slot 1 using the RS 603 that is received from the base station 602. In this approach, the interference measurement by other UEs (e.g., that would result from rescheduling of the UE 604 to subband 3 and beam 2) for all symbols of the slot may be accurate. The base station 602 will use added resources in order to transmit the RS in each of the symbols of slot 1. There may be a trade-off between the accuracy of the interference measurements and the resources allocated for RS transmission by the base station 602.

Although the above disclosure describes a UE being scheduled for a first subband-beam combination and measuring interference on a second subband-beam combination different from the first subband-beam combination, and performing the measurement during the same slot as the slot in which the UE is scheduled for the first subband-beam combination, the present disclosure is not limited thereto. In some aspects, the UE may be scheduled for the first subband-beam combination in a first slot and may measure the interference for the second, non-scheduled subband-beam combination in another slot.

Figure 7:
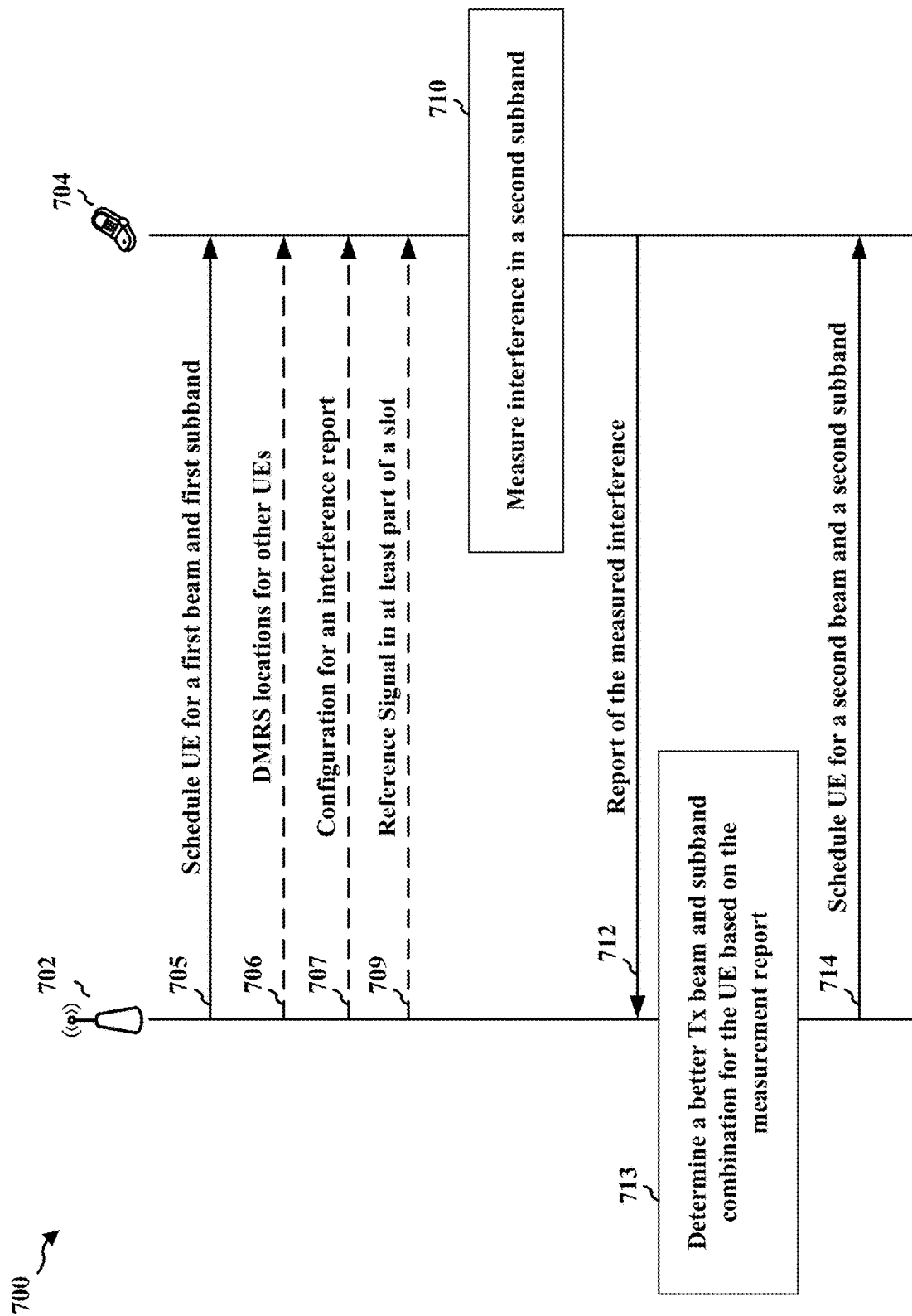
FIG. 7 is a visual depiction call flow diagram of interference measurement per subband per Tx beam.

FIG. 7 is a visual depiction call flow diagram of interference measurement per subband per Tx beam. A base station 702 may schedule a UE 704 for communication using a first beam in a first subband, e.g., as described in connection with any of FIGS. 4-6, and the base station 702 may transmit the scheduling 705 to the UE 704. For example, the UE 704 may receive scheduling on beam 1 subband 1 from the base station 702. In some aspects, as will be discussed further below, the UE may measure the interference for a non-configured/non-scheduled Tx beam and subband combination. For example, the UE 704 may measure interference on subband 3 for beam 2 using non-configured resources (e.g., resources for which the UE 704 is not scheduled to receive communication from the base station 702), as described in connection with FIG. 4. In some aspects, the UE 704 may measure interference on a Tx beam and subband combination other than the scheduled beam and subband combination based on scheduled interference measurement resources (e.g, zero-power CSI-RS or non-zero-power CSI-RS) from the base station. As described with respect to FIG. 4, the UE 704 may proactively measure the interference using beam 2 in subband 3, for example.

In some aspects, as described above, the base station 702 may transmit DMRS locations 706 for other UEs to the UE 704. The DMRS locations 706 may be locations (e.g., resources) scheduled for the base station 702 to transmit DMRS to other UEs scheduled in the non-configured/non-scheduled Tx beam and subband combination in which the UE 704 will measure interference.

The base station may configure the UE 704 for an interference report and transmit the configuration for the interference report 707 to the UE 704. The UE 704 may receive the configuration for the interference report 707.

In some aspects, the base station 702 may transmit a RS 709 to the UE 704. In one approach, the base station 702 may transmit the RS 709 in at least a subset of symbols of a slot on the second subband in the second beam direction. For example, the base station may transmit the RS 709 in subset of symbols in subband 3 for beam 2 in slot 1 as illustrated in FIG. 5. In some aspects, the base station may transmit the RS 709 in every symbol for measurement as illustrated in FIG. 6.

At 710, the UE 704 may measure interference in a second subband. In some aspects, the UE 704 may measure interference in the second subband and in a second Tx beam direction. In some aspects, the UE 704 may measure interference in the second subband in the first Tx beam direction. For example, the UE 704 may measure an SINR, RSRP, etc. for the second subband and first or second Tx beam direction. In some aspects, the UE 704 may measure interference or SINR and/or RSRP on the second subband and the first or second Tx beam direction without active traffic from the base station 702 for the UE 704 and without being scheduled to measure on the second subband and the second Tx beam direction by the base station 702 (e.g., may measure autonomously). In some aspects, the UE 704 may measure the interference using the reference signal 709 from the base station 702 in at least a portion of the slot. As described above, the UE 704 may determine intra-cell interference (or a value corresponding to the intra-cell interference) on the second subband and first or second Tx beam direction based on DMRS transmitted by the base station 702 for other UEs based on the DMRS locations 706 for other UEs. For example, the UE 704 may measure the DMRS received at the DMRS locations 706 and may determine the interference (or a value corresponding to the interference) that will be received from the other UEs in the second subband and first or second Tx beam direction based on the DMRS received at the DMRS location 706. The UE 704 may determine inter-cell interference (or a value corresponding to the inter-cell interference) on the second subband and first or second Tx beam direction by removing the intra-cell interference from the overall interference measured on the second subband and first or second Tx beam direction.

The UE 704 may transmit a report 712 of the interference that was measured at 710 (e.g., measured using the non-configured resources or the RS 709). The report 712 may be based on the configuration for the interference report 707 received from the base station 702. The UE 704 may report measurements for one or more Tx beam and subband combinations (e.g., in the report 712 or in separate reports). The report 712 may indicate the overall interference measured for the second subband and first or second Tx beam direction (e.g., based on SINR or RSRP), may include intra-cell interference measured for the second subband and first or second Tx beam direction, and/or may include the inter-cell interference measured for the second subband and first or second Tx beam direction. The UE 704 may determine the one or more types of interference and include the interference in the report 712, or may include values of measurements corresponding to the one or more types of interference in the report 712 and the base station 702 may determine the one or more types of interference from the measurements.

If the interference(s) reported by the UE 704 show low interference (e.g., overall interference, intra-cell interference, or inter-cell interference) on a second, non-scheduled Tx beam and subband, and/or if the quality of the Tx beam and subband scheduled for the UE in scheduling 705 is poor, the base station 702 may reschedule the UE 704 in the first or second beam in the second subband (e.g., subband 3 for beam 1 or beam 2) with lower interference and may transmit scheduling 714 to the UE 704. For example, at 713, the base station 702 may determine a better Tx beam and subband combination for the UE 704 based on the report 712 received from the UE 704, and the scheduling 714 may reschedule the UE 704 to use the better Tx beam and subband combination.

Figure 8:
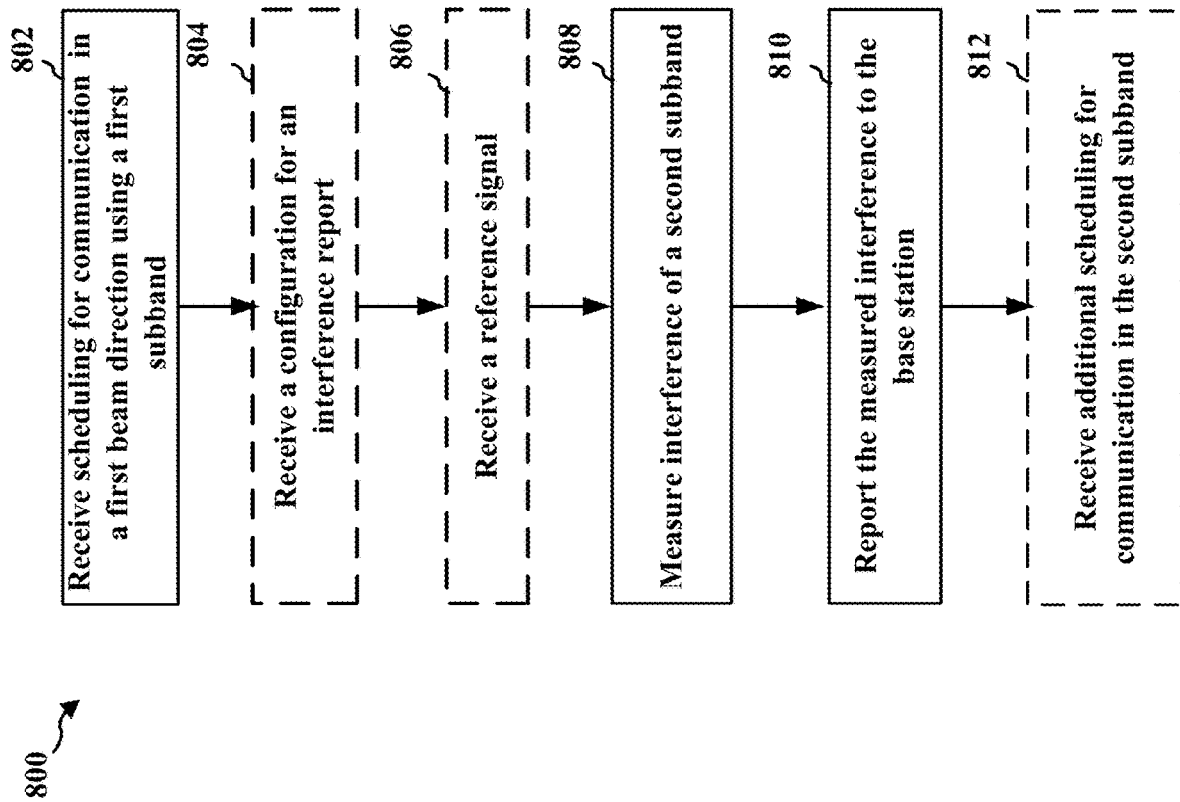
FIG. 8 is a flowchart of a method of wireless communication.

FIG. 8 is a flowchart 800 of a method of wireless communication. The method may be performed by a UE (e.g., the UE 104, 404, 504, 604, 704, 1250; the apparatus 902/902'; the processing system 1014, which may include the memory 360 and which may be the entire UE or a component of the UE, such as the TX processor 368, the RX processor 356, and/or the controller/processor 359). To facilitate an understanding of the techniques and concepts described herein, the method of flowchart 800 may be discussed with reference to the examples illustrated in FIGS. 4-7. Optional aspects may be illustrated in dashed lines. Aspects presented herein provide for improved measurement and management of interference for different subbands and different Tx beams for communication with the UEs. Aspects may provide an efficient way to determine interference in a particular subband for a specific Tx beam and to find a better beam and subband for transmitting communication to a UE. The method may enable the UE to perform interference measurement per beam per subband and to assist the base station in scheduling the UE for a subband with lower interference for communication, thereby increasing reliability and lowing latency.

Figure 9:
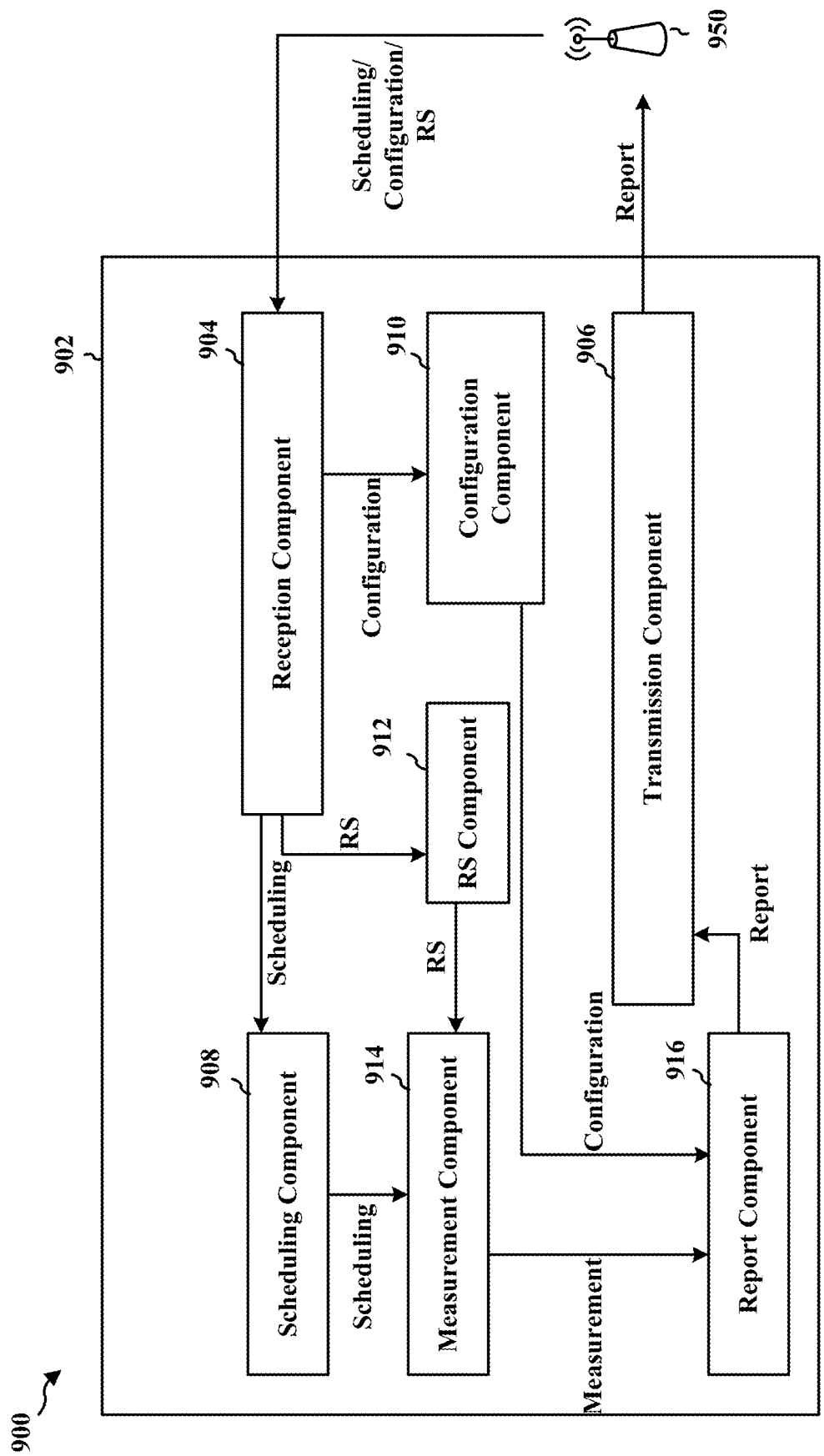
FIG. 9 is a conceptual data flow diagram illustrating the data flow between different means/components in an example apparatus.

At 802, the UE may receive scheduling for communication with a base station in a first beam direction using a first subband. For example, 802 may be performed by a scheduling component 908 as illustrated in FIG. 9. For example, referring back to FIGS. 4-7, at 705, a base station 702 may schedule a UE 702 for communication using a first beam in a first subband, e.g., as described in connection with any of FIGS. 4-6. For example, the UE 704 may receive scheduling on beam 1 subband 1 from the base station 702.

At 804, the UE may receive a configuration for an interference report. For example, 804 may be performed by a configuration component 910 as illustrated in FIG. 9. In some aspects, the UE may report the measured interference using the non-configured resources based on the configuration for the interference report. For example, referring back to FIGS. 4-7, at 707, the base station may configure the UE 704 for an interference report. The UE 704 may receive a configuration for the interference report. In the example in FIG. 4, there may be no resources configured for the UE to perform the measurements. Thus, the base station might not schedule resources for the measurement or transmit a reference signal for the UE to use in performing the measurement. The base station may configure the UE for an interference report. Therefore, the UE may use resources that are not configured or scheduled for interference measurement, e.g., as selected by the UE, and may send the report to the base station based on a report configuration.

At 806, the UE may receive an RS from the base station in at least a subset of symbols of a slot on the second subband. For example, 806 may be performed by an RS component 912 as illustrated in FIG. 9. The UE may measure interference on the second subband for a second beam direction, and wherein the DMRS sent from the base station to another UE may be scheduled within the second subband and the second beam direction. The UE may measure the interference of active traffic on the second subband in using the reference signal from the base station. For example, referring back to FIGS. 4-7, the base station 702 may transmit an RS 709. In one approach, the base station 702 may transmit the RS in at least a subset of symbols of a slot on the second subband. For example, the base station may transmit the RS in subset of symbols in subband 3 for beam 2 in slot 1 as illustrated in FIG. 5. In one approach, the base station may transmit the RS in every symbol for measurement as illustrated in FIG. 6.

At 808, the UE may measure interference of the second subband. For example, 808 may be performed by a measurement component 914 as illustrated in FIG. 9. For example, referring back to FIGS. 4-7, at 710, the UE 704 may measure interference in a subband and Tx beam direction. For example, the UE 704 may measure an SINR, RSRP, etc. for the subband and Tx beam direction. Referring to FIGS. 4-6, the UE 704 may measure interference or SINR and/or RSRP without active traffic from the base station 702 for the UE 704. Alternatively, the UE 704 may measure the interference using the reference signal from the base station in at least a portion of the slot, at 709. FIG. 4 illustrates an example 400 of interference measurement per subband per Tx beam. This approach involves non-intrusive measurement of a subband and a Tx beam direction but intrusive scheduling. In this approach, a UE 404 may measure interference on a beam and subband combination that the UE 404 is not currently using to communicate (e.g., receive downlink transmissions) with a base station. The interference measurement may be based on a measured Signal to Interference plus Noise Ratio (SINR), Reference Signal Received Power (RSRP), etc., for the Tx beam and subband(s). Thus, the UE 404 measures interference on a subband and Tx beam direction without active traffic for the UE. In FIG. 4, the base station 402 schedules the UE 404 on beam 1 in subband 1 in slot 1. The UE 404 may measure the interference using beam 2 in subband 3 in time slot 1. The UE 404 may also measure beam 2 in subband 2, for example. The UE 404 may measure the interference for beam 2 in subband 3, e.g., based on SINR, RSRP, etc., without active traffic for the UE 404 on beam 2 in subband 3.

In some aspects, the UE may remove a DMRS from the base station for another UE from the measured interference prior to reporting the measured interference to the base station. For example, referring back to FIGS. 4-7, the base station 402 may send DMRS locations for the other UEs that have been scheduled, to the UE 404, such that the UE 404 may measure the DMRS for the other UE(s) scheduled in the second subband to estimate an intra-cell interference. By subtracting the intra-cell interference from a total measured received power, the UE 404 may have an estimate of the inter-cell interference.

In some aspects, the UE may measure the interference of the second subband based on an indication from the base station. For example, referring back to FIGS. 4-7, the base station 402 may further indicate to the UE 404 which Rx beam to use in each subband, such that the UE 404 may perform standalone interference measurement. If the interference measurements show low interference, and/or the quality of the current Tx beam and subband (e.g., beam 1 in subband 1) is poor, the base station 402 may reschedule the UE 404 in the new subband and beam combination (e.g., beam 2 in subband 3) so that the UE 404 may experience lower interference.

In the example in FIG. 4, there may be no resources configured for the UE to perform the measurements. Thus, the base station might not schedule resources for the measurement or transmit a reference signal for the UE to use in performing the measurement.

In the approach illustrated in FIG. 5, the base station 502 may transmit a RS in a subband and a specific Tx beam direction during a subset of symbols (e.g., 503) where other UEs may be co-scheduled. The UE 504 may measure the interference of active traffic in subband 3 for beam 2 in slot 1 using the RS 503 that it receives from the base station. In the approach illustrated in FIG. 6, the base station may transmit the RS over each symbol of the slot for measurement. The UE 604 may measure the interference of active traffic in subband 3 for beam 2 in slot 1 using the RS 603 that is received from the base station 602.

At 810, the UE may report the measured interference to the base station. For example, 810 may be performed by a report component 916 as illustrated in FIG. 9. For example, referring back to FIGS. 4-7, at 712, the UE 704 may report the interference that was measured, e.g., using the non-configured resources, and the report may be based on the configuration 707 for the interference report. The UE may report measurements for one or more Tx beam and subband combinations.

At 812, the UE may receive additional scheduling for communication with the base station in the second subband after reporting the measured interference. For example, 812 may be performed by the scheduling component 908 as illustrated in FIG. 9. For example, referring back to FIGS. 4-7, at 714, if the measurement(s) reported by the UE 704 show low interference on a non-scheduled Tx beam and subband, or if the quality of existing Tx beam and subband is poor, the base station 702 may reschedule the UE 704 in the second beam in the second subband (e.g., subband 3 for beam 2) with lower interference. For example, at 713, the base station may determine a better Tx beam and subband combination for the UE 704 based on the report 712 received from the UE.

FIG. 9 is a conceptual data flow diagram 900 illustrating the data flow between different means/components in an example apparatus 902. The apparatus may be a UE (e.g., the UE 104, 404, 504, 604, 704, 1250; the apparatus 902/902'; the processing system 1014, which may include the memory 360 and which may be the entire UE or a component of the UE, such as the TX processor 368, the RX processor 356, and/or the controller/processor 359). The apparatus includes a reception component 904 that is configured to receive scheduling/configuration/RS from a base station, e.g., as described in connection with 802 in FIG. 8. The apparatus includes a transmission component 906 that is configured to transmit an interference measurement report to the base station, e.g., as described in connection with 810 in FIG. 8. The apparatus includes a scheduling component 908 that is configured to receive, via the reception component 904, scheduling information from the base station, e.g., as described in connection with 802 in FIG. 8. The apparatus includes a configuration component 910 that is configured to receive, via the reception component 904, configuration from the base station, e.g., as described in connection with 804 in FIG. 8. The apparatus includes an RS component 912 that is configured to receive, via the reception component 904, RS from the base station, e.g., as described in connection with 806 in FIG. 8. The apparatus includes a measurement component 914 that is configured to measure interference of a second subband, e.g., as described in connection with 808 in FIG. 8. The apparatus includes a report component 916 that is configured to transmit, via the transmission component 906, the interference measurement report to the base station, e.g., as described in connection with 810 in FIG. 8.

The apparatus may include additional components that perform each of the blocks of the algorithm in the aforementioned flowcharts of FIGS. 4-8. As such, each block in the aforementioned flowcharts of FIGS. 4-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
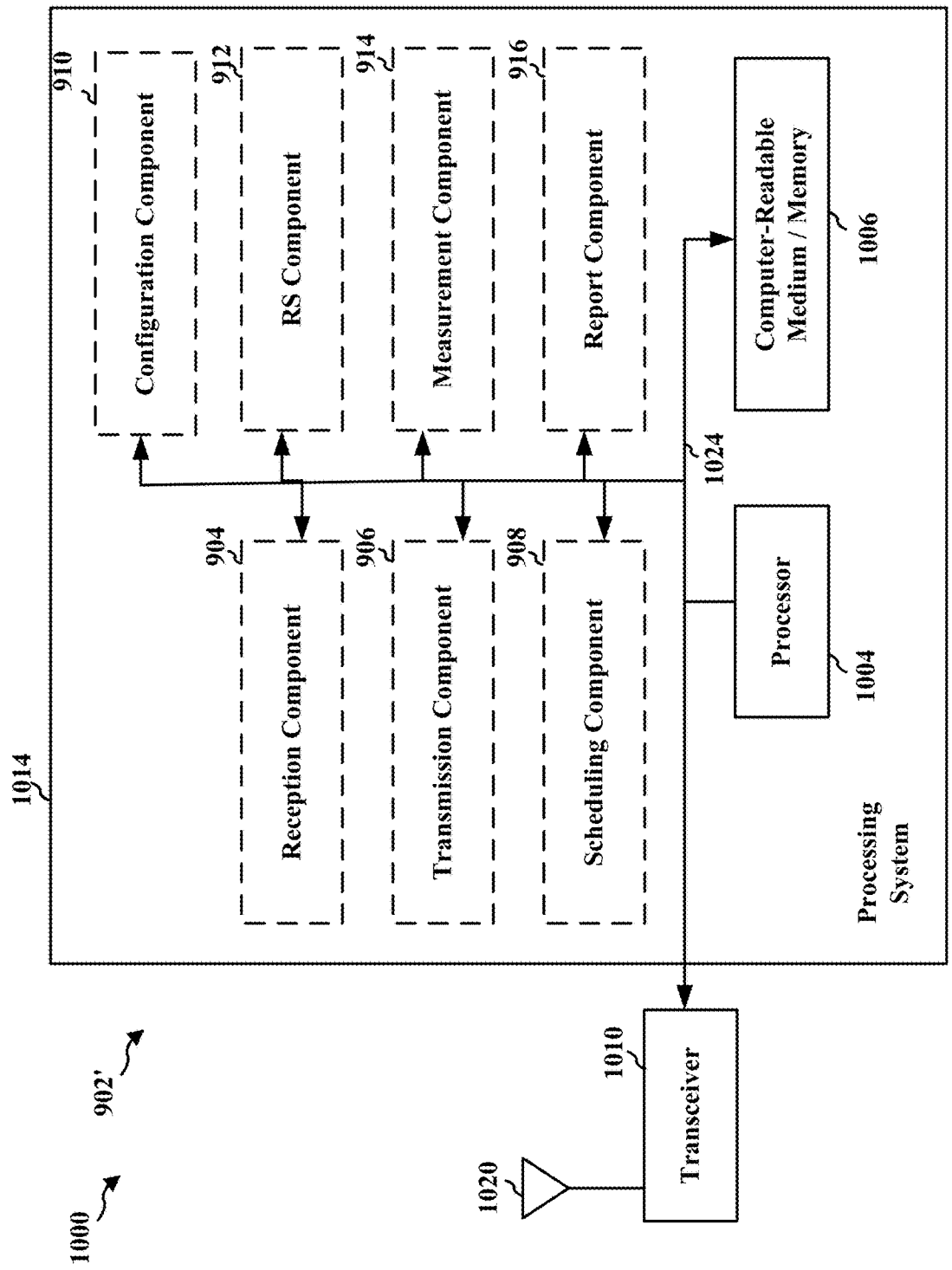
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 906, 908, 910, 912, 914, 916, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 906, 908, 910, 912, 914, 916. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359. Alternatively, the processing system 1014 may be the entire UE (e.g., see 350 of FIG. 3).

In one configuration, the apparatus 902/902' for wireless communication includes means for receiving scheduling for communication with a base station in a first beam direction using a first subband; means for measuring interference of a second subband; and means for reporting the measured interference to the base station. The apparatus further includes means for receiving additional scheduling for communication with the base station in the second subband after reporting the measured interference. The apparatus further includes means for receiving a configuration for an interference report, wherein the UE reports the measured interference using the non-configured resources based on the configuration for the interference report. The apparatus further includes means for receiving a reference signal from the base station in at least a subset of symbols of a slot on the second subband, wherein the UE measures the interference of active traffic on the second subband using the reference signal from the base station. The apparatus further includes means for receiving a reference signal from the base station in each symbol of a slot on the second subband, wherein the UE measures the interference of active traffic on the second subband using the reference signal from the base station.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
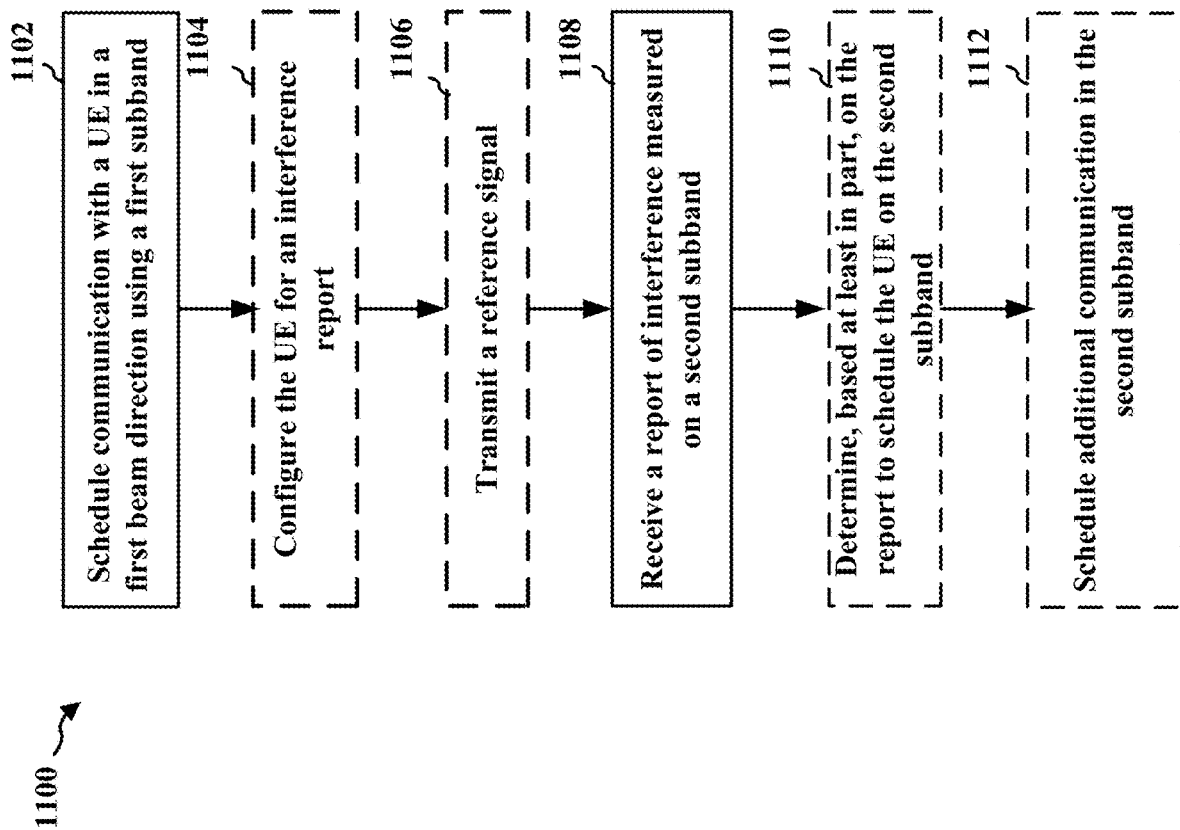
FIG. 11 is a flowchart of a method of wireless communication.

FIG. 11 is a flowchart 1100 of a method of wireless communication. The method may be performed by a base station (e.g., the base station 102/180, 402, 502, 602, 702, 950; the apparatus 1202/1202'; the processing system 1314, which may include the memory 376 and which may be the entire base station or a component of the base station, such as the TX processor 316, the RX processor 370, and/or the controller/processor 375). To facilitate an understanding of the techniques and concepts described herein, the method of flowchart 1100 may be discussed with reference to the examples illustrated in FIGS. 4-7. Optional aspects may be illustrated in dashed lines. Aspects presented herein provide for improved measurement and management of interference for different subbands and different Tx beams for communication with the UEs. Aspects may provide an efficient way to determine interference in a particular subband for a specific Tx beam and to find a better beam and subband for transmitting communication to a UE. The method may enable the UE to perform interference measurement per beam per subband and to assist the base station in scheduling the UE for a subband with lower interference for communication, thereby increasing reliability and lowing latency.

Figure 12:
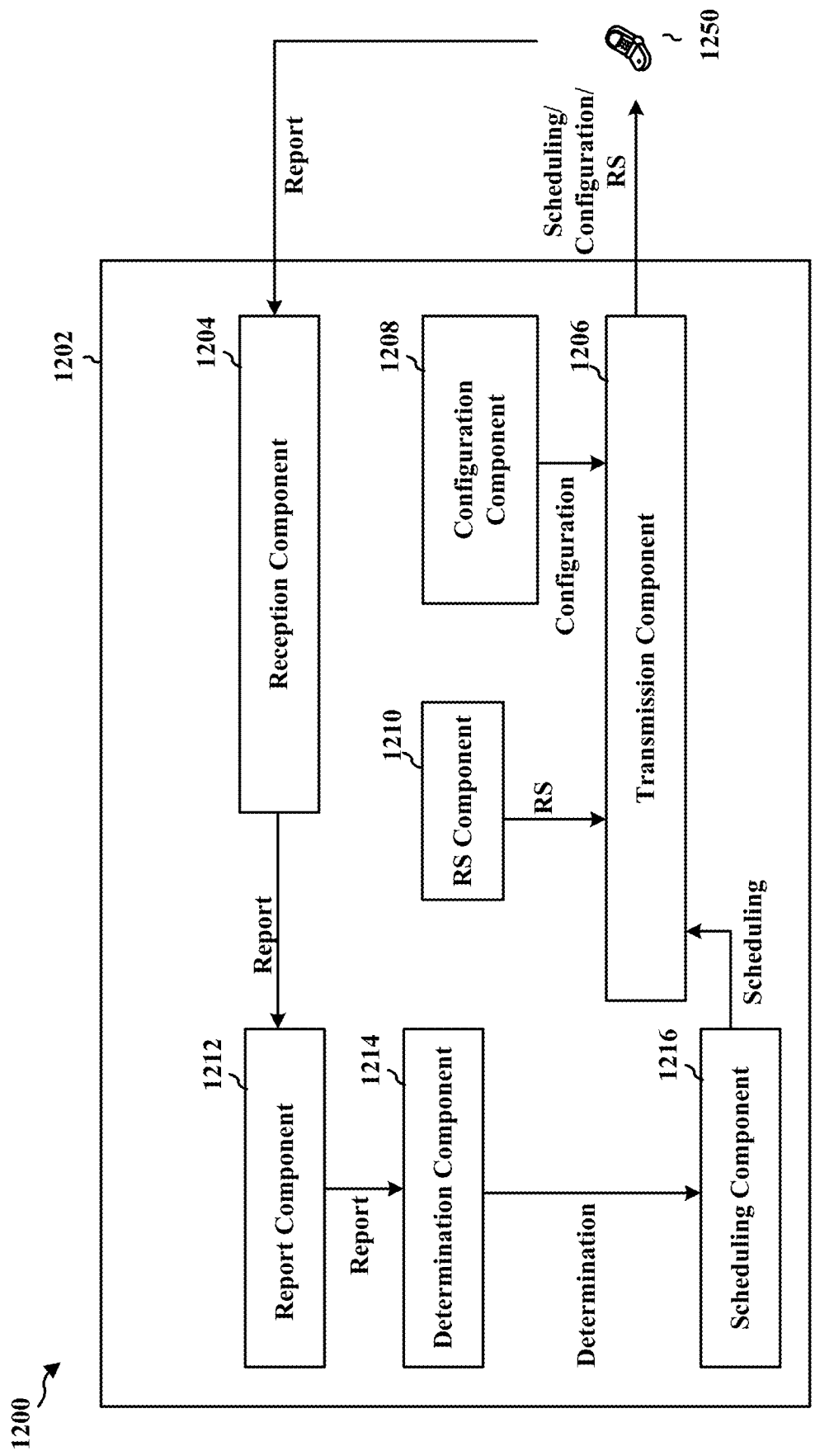
FIG. 12 is a conceptual data flow diagram illustrating the data flow between different means/components in an example apparatus.

At 1102, the base station may schedule communication with a UE in a first beam direction using a first subband. For example, 1102 may be performed by a scheduling component 1216 as illustrated in FIG. 12. For example, referring back to FIGS. 4-7, at 705, a base station 702 may schedule a UE 702 for communication using a first beam in a first subband, e.g., as described in connection with any of FIGS. 4-6. For example, the UE 704 may receive scheduling on beam 1 subband 1 from the base station 702.

At 1104, the base station may configure the UE for an interference report. For example, 1104 may be performed by a configuration component 1208 as illustrated in FIG. 12. In some aspects, the report received from the UE is based on a configuration from the base station. For example, referring back to FIGS. 4-7, at 707, the base station may configure the UE 704 for an interference report. The UE 704 may receive a configuration for the interference report. In the example in FIG. 4, there may be no resources configured for the UE to perform the measurements. Thus, the base station might not schedule resources for the measurement or transmit a reference signal for the UE to use in performing the measurement. The base station may configure the UE for an interference report. Therefore, the UE may use resources that are not configured or scheduled for interference measurement, e.g., as selected by the UE, and may send the report to the base station based on a report configuration.

At 1106, the base station may transmit an RS in at least a subset of symbols of a slot on the second subband. For example, 1106 may be performed by an RS component 1210 as illustrated in FIG. 12. The DMRS resource for another UE may be scheduled in the second subband in a second beam direction. The UE may measure the interference of active traffic on the second subband using the reference signal from the base station. For example, referring back to FIGS. 4-7, the base station 702 may transmit an RS 709.

In some aspects, the base station may transmit a DMRS to another UE in the second subband, wherein interference measured by the UE does not include a measurement of the DMRS from the base station. For example, referring back to FIGS. 4-7, the base station 402 may send DMRS locations for the other UEs that have been scheduled, to the UE 404, such that the UE 404 may measure the DMRS for the other UEs to estimate an intra-cell interference. By subtracting the intra-cell interference from a total measured received power, the UE 404 may have an estimate of the inter-cell interference.

In some aspects, the base station may indicate to the UE to measure the second subband. For example, referring back to FIGS. 4-7, the base station 402 may further indicate to the UE 404 which Rx beam to use in each subband, such that the UE 404 may perform standalone interference measurement. If the interference measurements show low interference, and/or the quality of the current Tx beam and subband (e.g., beam 1 in subband 1) is poor, the base station 402 may reschedule the UE 404 in the new subband and beam combination (e.g., beam 2 in subband 3) so that the UE 404 may experience lower interference.

In one approach, the base station 702 may transmit the RS in at least a subset of symbols of a slot on the second subband. For example, the base station may transmit the RS in subset of symbols in subband 3 for beam 2 in slot 1 as illustrated in FIG. 5. In one approach, the base station may transmit the RS in every symbol for measurement as illustrated in FIG. 6.

At 1108, the base station may receive a report of interference measured by the UE on a second subband. For example, 1108 may be performed by a report component 1212 as illustrated in FIG. 12. For example, referring back to FIGS. 4-7, at 712, the UE 704 may report the interference that was measured, e.g., using the non-configured resources, and the report may be based on the configuration 707 for the interference report. The UE may report measurements for one or more Tx beam and subband combinations.

At 1110, the base station may determine, based at least in part, on the report to schedule the UE on the second subband. For example, 1110 may be performed by the determination component 1214 as illustrated in FIG. 12. For example, referring back to FIGS. 4-7, if the measurement(s) reported by the UE 704 show low interference on a non-scheduled Tx beam and subband, or if the quality of existing Tx beam and subband is poor, the base station 702 may reschedule the UE 704 in the second beam in the second subband (e.g., subband 3 for beam 2) with lower interference. For example, at 713, the base station may determine a better Tx beam and subband combination for the UE 704 based on the report 712 received from the UE.

At 1112, the base station may schedule additional communication for the UE in the second subband. For example, 1112 may be performed by the scheduling component 1216 as illustrated in FIG. 12. For example, referring back to FIGS. 4-7, at 714, if the measurement(s) reported by the UE 704 show low interference on a non-scheduled Tx beam and subband, or if the quality of existing Tx beam and subband is poor, the base station 702 may reschedule the UE 704 in the second beam in the second subband (e.g., subband 3 for beam 2) with lower interference.

FIG. 12 is a conceptual data flow diagram 1200 illustrating the data flow between different means/components in an example apparatus 1202. The apparatus may be a base station (e.g., the base station 102/180, 402, 502, 602, 702, 950; the apparatus 1202/1202'; the processing system 1314, which may include the memory 376 and which may be the entire base station or a component of the base station, such as the TX processor 316, the RX processor 370, and/or the controller/processor 375). The apparatus includes a reception component 1204 that is configured to receive an interference measurement report from a UE, e.g., as described in connection with 1102 in FIG. 11. The apparatus includes a transmission component 1106 that is configured to transmit scheduling/configuration/RS to the UE, e.g., as described in connection with 1102, 1104, and 1106 in FIG. 11. The apparatus includes a scheduling component 1216 that is configured to transmit, via the transmission component 1106, scheduling information to the UE, e.g., as described in connection with 1102 in FIG. 11. The apparatus includes a configuration component 1208 that is configured to transmit, via the transmission component 1106, configuration to the UE, e.g., as described in connection with 1104 in FIG. 11. The apparatus includes an RS component 1210 that is configured to transmit, via the transmission component 1106, RS to the UE, e.g., as described in connection with 1106 in FIG. 11. The apparatus includes a determination component 1114 that is configured to determine, based at least in part, on the report to schedule the UE on the second subband, e.g., as described in connection with 1110 in FIG. 11.

The apparatus may include additional components that perform each of the blocks of the algorithm in the aforementioned flowcharts of FIGS. 4-7 and 11. As such, each block in the aforementioned flowcharts of FIGS. 4-7 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
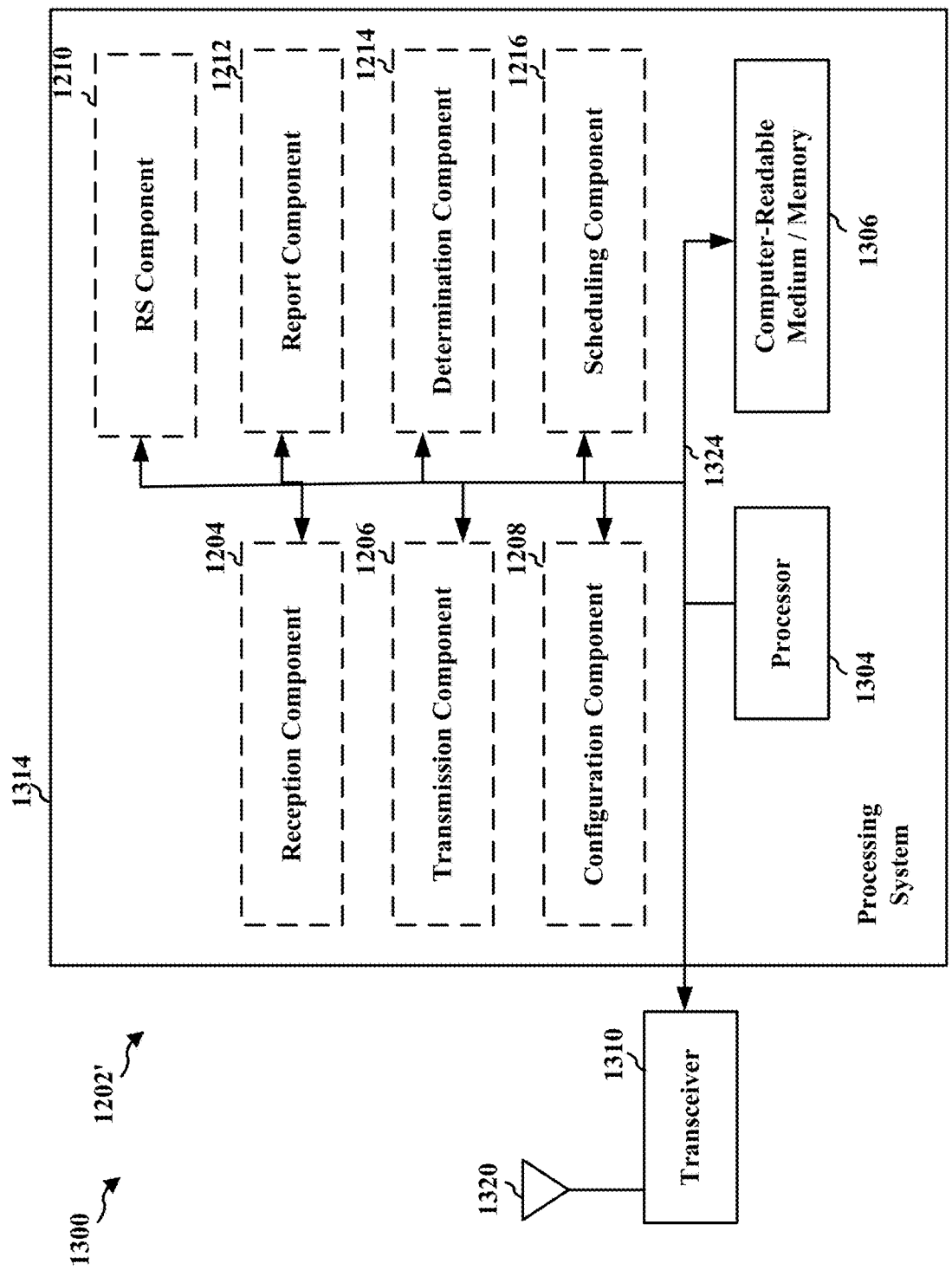
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1206, 1208, 1210, 1212, 1214, 1216, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1004, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1206, 1208, 1210, 1212, 1214, 1216. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375. Alternatively, the processing system 1314 may be the entire base station (e.g., see 310 of FIG. 3).

In one configuration, the apparatus 1202/1202' for wireless communication includes means for scheduling communication with a user equipment (UE) in a first beam direction using a first subband; and means for receiving a report of interference measured by the UE on a second subband. The apparatus may further includes means for determining, based at least in part, on the report to schedule the UE on the second subband and means for scheduling additional communication for the UE in the second subband. The apparatus may further includes means for configuring the UE for an interference report, wherein the report received from the UE is based on a configuration from the base station. The apparatus may further includes means for transmitting a reference signal in at least a subset of symbols of a slot on the second subband, wherein the report indicates the interference for the reference signal caused by active traffic on the second subband. The apparatus may further includes means for transmitting a reference signal from the base station in each symbol of a slot on the second subband, wherein the report indicates the interference for the reference signal caused by active traffic on the second subband.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    receiving scheduling for communication with a base station in a first beam direction using a first subband;
    measuring interference on a second subband for a second beam direction with respect to the base station, wherein the UE is not scheduled for communication with the base station in the second subband for the second beam direction;
    measuring a demodulation reference signal (DMRS) sent from the base station to another UE scheduled within the second subband;
    reporting the measured interference to the base station based on the measured DMRS sent to the another UE; and
    receiving additional scheduling for communication with the base station in the second subband after reporting the measured interference,
    wherein measuring interference on the second subband is based on an indication from the base station.

2. The method of claim 1, wherein the DMRS sent from the base station to another UE is scheduled within the second subband and the second beam direction.

3. The method of claim 1, further comprising receiving, from the base station, an indicator of a resource scheduled for the DMRS sent from the base station to another UE.

4. An apparatus for wireless communication at a user equipment (UE), comprising:
    a memory; and
    at least one processor coupled to the memory and configured to:

receive scheduling for communication with a base station in a first beam direction using a first subband;
measure interference on a second subband for a second beam direction with respect to the base station, wherein the UE is not scheduled for communication with the base station in the second subband for the second beam direction;
measure a demodulation reference signal (DMRS) sent from the base station to another UE scheduled within the second subband;
report the measured interference to the base station based on the measured DMRS sent to the another UE; and
receive additional scheduling for communication with the base station in the second subband after reporting the measured interference,
wherein the processor is configured to measure the interference of the second subband based on an indication from the base station.

5. The apparatus of claim 4, wherein the DMRS sent from the base station to another UE is scheduled within the second subband and the second beam direction.

6. The apparatus of claim 4, wherein the processor is further configured to receive, from the base station, an indicator of a resource scheduled for the DMRS sent from the base station to another UE.

7. The apparatus of claim 4, wherein the measured interference is reported to the base station based on the measured DMRS sent to the another UE by reporting an indication of one of an overall interference measured on the second subband, an intra-cell interference measured on the second subband, or an inter-cell interference measured on the second subband.

8. The apparatus of claim 4, wherein the measured interference is reported to the base station based on the measured DMRS by removing the DMRS from the measured interference to determine an inter-cell interference on the second subband.

9. The apparatus of claim 4, wherein the processor is configured to measure the interference of the second subband using non-scheduled resources.

10. The apparatus of claim 9, wherein the processor is further configured to receive a configuration for an interference report, and wherein the processor is configured to report the measured interference using the non-scheduled resources based on the configuration for the interference report.

11. The apparatus of claim 4, wherein the processor is further configured to receive a reference signal from the base station in at least a subset of symbols of a slot on the second subband, and wherein the processor is configured to measure the interference of active traffic on the second subband using the reference signal from the base station.

12. The apparatus of claim 4, wherein the processor is further configured to receive a reference signal from the base station in each symbol of a slot on the second subband, and wherein the processor is configured to measure the interference of active traffic on the second subband using the reference signal from the base station.

13. A method of wireless communication at a base station, comprising:
scheduling communication with a user equipment (UE) in a first beam direction using a first subband;
transmitting an indicator of a scheduled downlink modulation reference signal (DMRS) resource for another UE scheduled in a second subband different from the first subband and for a second beam direction with respect to the base station, wherein the UE is not scheduled for communication with the base station in the second subband for the second beam direction, and wherein the base station is further configured to indicate to the UE to measure interference for the second subband;
receiving a report of interference measured by the UE on the second subband based on the DMRS for another UE;
determine, based at least in part on the report, to schedule the UE on the second subband; and
schedule additional communication for the UE using the second subband.

14. The method of claim 13, wherein the report comprises an interference measured on the second subband and a measurement of the DMRS transmitted on the scheduled DMRS resources for another UE, the method further comprising determining an inter-cell interference for the UE on the second subband based on the interference and the measurement of the DMRS.

15. An apparatus for wireless communication at a base station, comprising:
a memory; and
at least one processor coupled to the memory and configured to:
schedule communication with a user equipment (UE) in a first beam direction using a first subband;
transmit an indicator of a scheduled downlink modulation reference signal (DMRS) resource for another UE scheduled in a second subband for a second beam direction with respect to the base station, wherein the UE is not scheduled for communication with the base station in the second subband for the second beam direction;
receive a report of interference measured by the UE on the second subband based on the DMRS for another UE;
determine, based at least in part on the report, to schedule the UE on the second subband; and
schedule additional communication for the UE using the second subband,
wherein the processor is further configured to indicate to the UE to measure interference for the second subband.

16. The apparatus of claim 15, wherein the report comprises an interference measured on the second subband and a measurement of the DMRS transmitted on the scheduled DMRS resource for another UE.

17. The apparatus of claim 16, wherein the processor is further configured to determine an inter-cell interference for the UE on the second subband based on the interference and the measurement of the DMRS from the report.

18. The apparatus of claim 15, wherein the report comprises an inter-cell interference for the UE on the second subband, the inter-cell interference being based on a measurement of the DMRS transmitted on the scheduled DMRS resource.

19. The apparatus of claim 15, wherein the report indicates interference measured on non-scheduled resources.

20. The apparatus of claim 19, wherein the processor is further configured to configure the UE for an interference report, wherein the report received from the UE is based on the configured interference report.

21. The apparatus of claim 15, wherein the processor is further configured to transmit a reference signal in at least a subset of symbols of a slot on the second subband, and wherein the report indicates the interference for the reference signal caused by active traffic on the second subband.

22. The apparatus of claim 15, wherein the processor is further configured to transmit a reference signal from the base station in each symbol of a slot on the second subband, and wherein the report indicates the interference for the reference signal caused by active traffic on the second subband.

\* \* \* \* \*